United States Patent [19]

Joy

[11] Patent Number: 4,594,850

[45] Date of Patent: Jun. 17, 1986

[54] COMBINED CYCLE TOTAL ENERGY SYSTEM

[75] Inventor: John R. Joy, Brighton, Mich.

[73] Assignee: Williams International Corporation, Walled Lake, Mich.

[21] Appl. No.: 464,196

[22] Filed: Feb. 7, 1983

[51] Int. Cl.[4] ............................................. F02C 7/26
[52] U.S. Cl. ............... 60/39.141; 60/39.182; 60/723; 60/737
[58] Field of Search ............ 60/39.12, 39.141, 39.182, 60/737, 39.465, 39.511, 723

[56] References Cited

U.S. PATENT DOCUMENTS

| | | | |
|---|---|---|---|
| 2,723,531 | 11/1955 | Wosika et al. | 60/39.141 X |
| 3,161,020 | 12/1964 | La Haye | 60/39.465 X |
| 3,177,659 | 4/1965 | Berman | 60/39.182 |
| 3,195,306 | 7/1965 | Jonakin | 60/39.182 |
| 3,500,636 | 3/1970 | Craig | 60/39.182 X |
| 3,928,961 | 12/1975 | Pfefferle | 60/39.06 |
| 4,202,168 | 5/1980 | Acheson et al. | 60/39.465 X |

Primary Examiner—Louis J. Casaregola
Assistant Examiner—Donald E. Stout
Attorney, Agent, or Firm—Lyman R. Lyon

[57] ABSTRACT

The disclosure relates to a system for the co-generation of steam and electricity from a gaseous fuel. A Brayton cycle turbine drives first and second fuel and air compressors as well as an electric generator. Steam is also produced by the system for direct utilization or to drive a steam turbine which also drives the generator.

1 Claim, 2 Drawing Figures

COMBINED CYCLE TOTAL ENERGY SYSTEM

BACKGROUND OF THE INVENTION

1. Field of the Invention

This invention relates to a system for the cogeneration of electric power and steam and more specifically to a system that utilizes catalytic combustion of natural gas for the generation of electric power and steam. A unique arrangement of components operate in a Brayton and Rankine combined cycle.

2. Description of the Prior Art

An electric power generation system which uses a multiplicity of parallel shafts engaged with a common bull gear is taught in application Ser. No. 401,822, filed July 26, 1982, entitled "Electric Power Generation From Waste Heat", and assigned to the assignee of the instant invention. It is also known to use an expansion turbine and compressor jointly coupled to a generator to provide electric power.

SUMMARY OF THE INVENTION

The present invention relates to a low-cost combined cycle cogeneration system that is supplied in pre-engineered, pre-packaged, units weighing about 20,000 pounds each.

A waste heat power generation system in accordance with the invention utilizes catalytic combustion to burn the very lean mixture of fuel gas and air which result, when fuel gas and air are jointly compressed, in a single gas turbine compressor system. This arrangement makes cogeneration relatively attractive. Cogeneration makes it economical for small plants to produce their own electric power and steam. High reliability is achieved by the simplicity of the mechanical design and the arrangement of the turbomachinery around a single gearbox. This arrangement allows use of both a single control and electric system.

The turbomachinery components are mounted on shafts cantilevered from a gearbox and comprise low and high pressure radial compressors, a three-stage gas turbine, and a two-stage steam turbine. The casings for each of the aforesaid units are bolted to the gearbox. Each of the four rotating assemblies are mounted on shafts extending out from the gearbox. Each unit is designed to permit easy removal for inspection and maintenance without disturbing the gearbox assembly.

The gearbox contains all the lubricated elements, such as gears, bearings, and seals. It is designed to operate 50,000 hours between overhauls. The gearbox output shaft drives a 60-cycle generator which serves as both starter and generator. The simplest and lowest cost system uses a squirrel cage induction motor driven above synchronous speed to produce electric power. In some instances, a self-excited generator may be used having induction windings to provide adequate starting torque. In either case the generator can provide mechanical starting power thereby eliminating the need for a separate electric starter.

The use of a combining gearbox permits the use of a single electric generator and a single control system with an obvious cost advantage. The overhung turbomachinery components offer flexibility to change component size to satisfy special customer requirements. This feature can be used to provide growth for expansion or to maximize performance by tailoring the plant rating to a customer requirement.

DETAILED DESCRIPTION OF THE PREFERRED EMBODIMENT OF THE INVENTION

Figure 1:
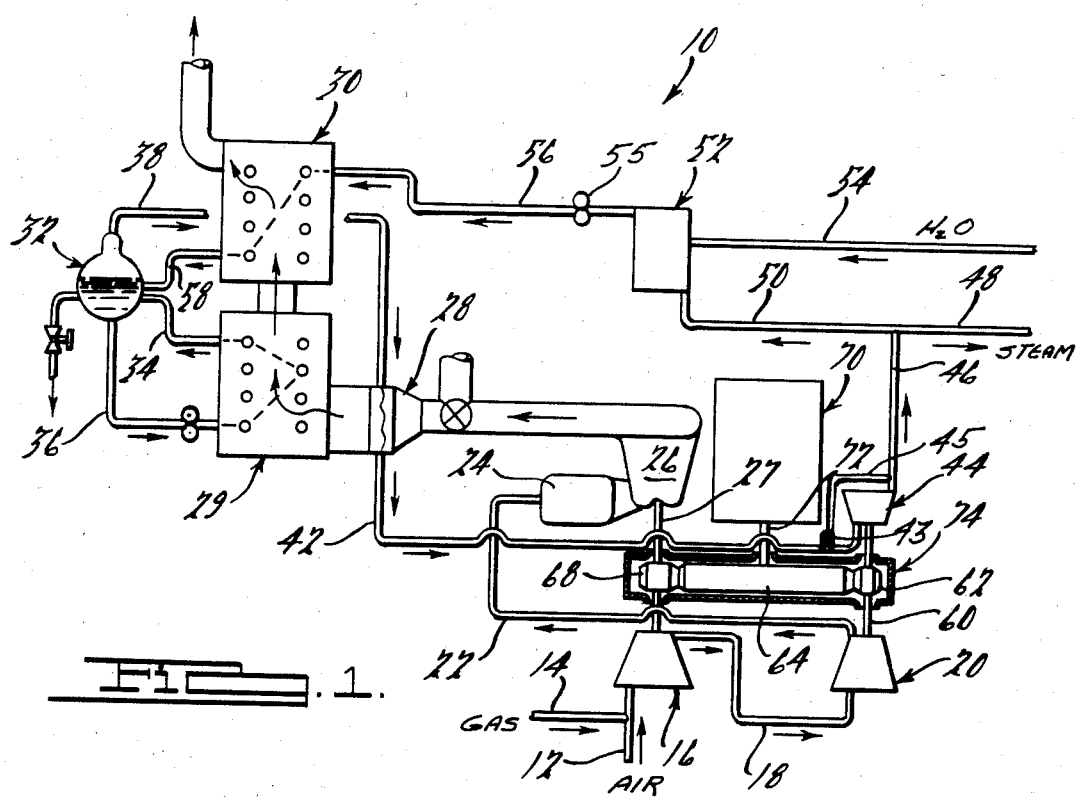
FIG. 1 is a schematic representation of the power generation system of the instant invention.

More specifically, a source of fuel gas, not shown, is connected to an air inlet line 12 by a conduit 14. The fuel gas is admixed with air at 60° F. flowing at a rate of 13.3 lbs/sec to a first stage compressor 16. The compressed mixture is conducted through a conduit 18 to a second stage or high pressure compressor 20, leaving the second stage compressor 20 at 139 PSIA and 660° F. The compressed fuel-air mixture is then conducted through a conduit 22 to a catalytic burner 24 of a gas turbine 26. The gas turbine 26 has an output shaft 27 that directly drives the first stage compressor 16 and other turbomachinery, as will be described.

Gas turbine exhaust discharge gas at 963° F. and flowing at 13.3 lbs/sec is cooled in a steam superheater 28 to 900° F. after which it passes through a boiler 29 to an economizer 30 at 395° F., discharging to atmosphere at 298° F.

A boiler drum 32 has hot water inlet and outlet conduits 34 and 36, respectively, connected to the boiler 29 for the heating of water by the gas turbine exhaust gases. Steam from the boiler drum 32 is conducted by a conduit 38 to the superheater 28, leaving the superheater 28 in a conduit 42 at 530° F. and 150 PSIA. The steam is thereafter conducted by the conduit 42 to a valve 43, thence to a steam turbine 44 or to a turbine bypass conduit 45, selectively. Steam enters the steam turbine 44 at 530° F., 150 PSIA and at the rate of 7120 lbs/hr. The mechanical output of the steam turbine 44 effects drive of the second stage compressor 20, as well maximizing power generation. The turbine 44 is bypassed via conduit 45 to maximize steam output of the system 10, as will be described.

After expansion, steam is discharged from the turbine 44 through conduits 46 and 48 to process equipment, not shown, at 240° F. and 20 PSIA at a flow rate of 6324 lbs/hr. Condensate is conducted through a conduit 50, to a deaerating feed water heater 52 at the rate of 796 lbs/hr. Make-up water at 80° F. at the rate of 6538 lbs/hr is fed to the deaerating feed water heater 52 through a conduit 54, hot water being discharged from a pump 55 through a conduit 56 at 200° F. and 165 PSIA, to the economizer 30, thence to the boiler drum 32 through a conduit 58.

Figure 2:
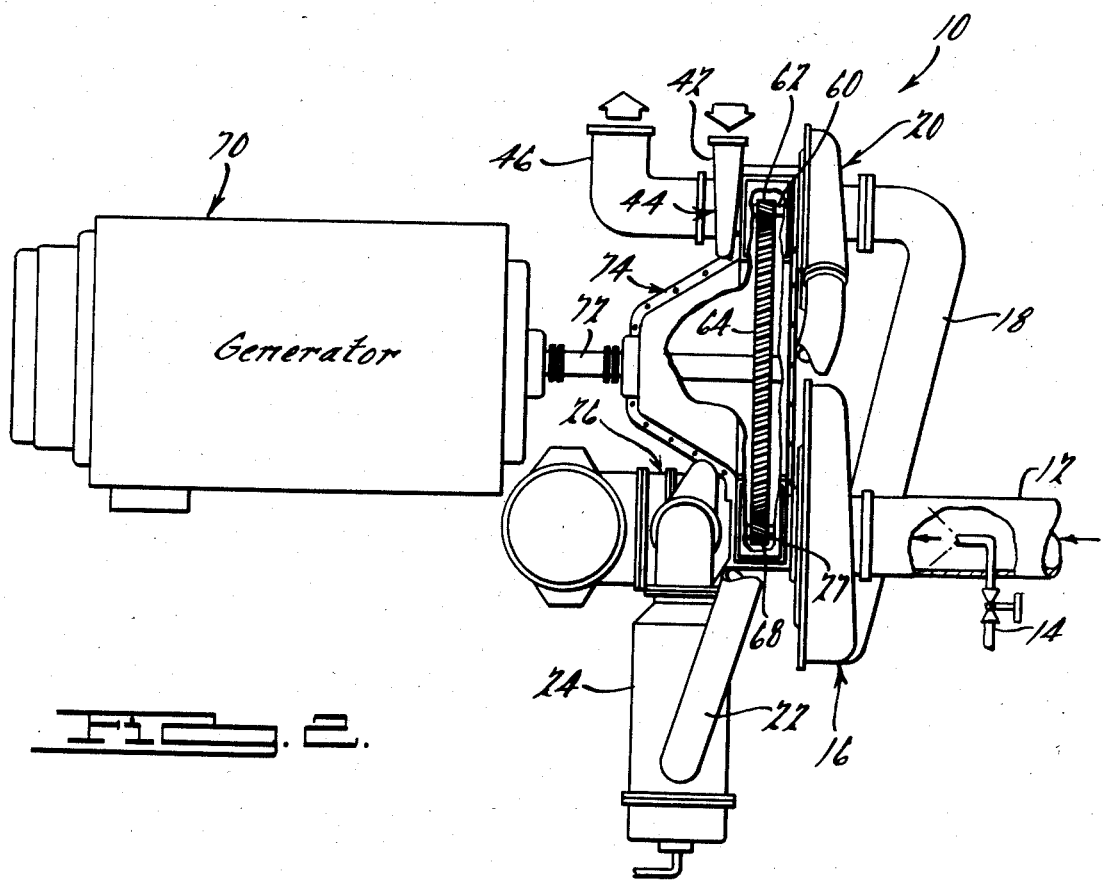
FIG. 2 is a side elevation view, partially in section, of the turbomachinery used in the system of FIG. 1.

As seen in FIG. 2 of the drawing, the power generation system 10 in accordance with the present invention comprises the low pressure air compressor 16 which is mounted at one end of the turbine output shaft 27. The turbine output shaft 27 and compressor 16 are directly driven by the three-stage gas turbine 26. The second-stage compressor 20 is driven by a steam turbine output or shaft 60 which carries a pinion gear 62 that meshes with a bull gear 64. The bull gear 64 is also meshed with a pinion gear 68 on the gas turbine output shaft 27. While only two stages of compression are shown, it is evident that the invention contemplates any desired number of compressor stages, and any number of high-speed shafts.

The turbine 26 produces sufficient power to drive the low and high pressure compressors 16 and 20, as well as a 1370 KW 4160 V motor/generator 70 through a shaft 72 coupled to the bull gear 64. The motor/generator 70 may be of the induction or synchronous type and is used to initiate circulation of air through the Brayton Cycle system 10 and to accelerate it to a speed at which the system 10 is self-sufficient. When sufficient heat is supplied to the system 10, the system will generate electric power and process steam as discussed above.

One of the features of the instant invention is that the gas turbine 26 and compressor 16, steam turbine 44 and compressor 20, and motor/generator 70 are overhung on shafts 27, 60 and 72, respectively. The shafts 26, 60 and 72 are journaled in a common gearbox 74 in such a way that all bearings, gears, seals and other elements requiring lubrication are contained within the gearbox 74. Another feature is that the separate shafts 27 and 60 provide for operation of the compressors 16 and 20, respectively, at different speeds so that each compressor may operate at its most efficient speed.

Yet another feature of the invention is the provision of the dual purpose electric motor/generator 70 which serves to accelerate the compressors 16 and 20 and turbine 26 of the system 10 to a self-sufficient speed when supplied with electric power from an outside source, thereafter producing electric power.

From the foregoing description it should be apparent that a facility employing the cogeneration system of the instant invention can either use all of the electricity produced, or if there is a surplus, sell the excess back to a utility, the governing consideration being the amount and nature of the heat produced. It is proposed that process heat be supplied in the form of saturated steam at 5 psig. Steam at this condition is eminently suitable for most processes and for such purposes as space heating, hot water, or absorption chillers (central air conditioning units). If, on the other hand, higher steam pressures are required, these can be provided at the superheater 28 by bypassing some or all of the steam around the steam turbine 44. If this option is selected, it would be desirable to incorporate an over-running clutch (not shown) on the steam turbine shaft 60 within the gearbox 74 to avoid torque reversals and the drag losses that would be produced if a large percentage of steam is diverted around the turbine 44.

The instant invention discloses a commercially feasible, combined cycle, total energy system which will increase the utilization of natural gas for the benefit of the general public through lower energy costs and reduced air pollution.

While the preferred embodiment of the invention has been disclosed, it should be appreciated that the invention is susceptible of modification without departing from the scope of the following claims.

I claim:

1. A system for the co-generation of steam and electricity comprising:
   a source of gaseous fuel,
   a source of air,
   means for mixing said fuel and air to form a relatively lean fuel/air mixture,
   a gas turbine,
   a first fuel/air mixture compressor directly driven by said turbine,
   a second fuel/air mixture compressor driven by said turbine for further compressing said fuel/air mixture,
   a catalytic burner between said second compressor and gas turbine,
   a motor/generator,
   a steam turbine,
   means coupling said gas turbine, motor/generator, first and second compressors and steam turbine to one another,
   a source of water,
   a steam boiler connected to said source of water and to the exhaust system of said gas turbine,
   a steam economizer connected to said boiler,
   a steam superheater in heat exchange relationship with the exhaust system of said gas turbine disposed between said economizer and said steam turbine, and
   controllable means for bypassing superheated steam from said superheater around said steam turbine to maximize steam or electric power output of said system, selectively.

* * * * *